United States Patent
Buzinover et al.

(10) Patent No.: US 11,991,410 B2
(45) Date of Patent: May 21, 2024

(54) VIDEO PROCESSING METHOD, VIDEO PROCESSING APPARATUS, AND NON-TRANSITORY COMPUTER-READABLE STORAGE MEDIUM

(71) Applicant: LEMON INC., Grand Cayman (KY)

(72) Inventors: Michael Buzinover, Culver City, CA (US); Shen Li, Beijing (CN); Chenman Zhou, Beijing (CN); Xuelun Fu, Beijing (CN)

(73) Assignee: Lemon Inc., Grand Cayman (KY)

( * ) Notice: Subject to any disclaimer, the term of this patent is extended or adjusted under 35 U.S.C. 154(b) by 11 days.

(21) Appl. No.: 17/723,881

(22) Filed: Apr. 19, 2022

(65) Prior Publication Data

US 2023/0139768 A1    May 4, 2023

(30) Foreign Application Priority Data

Oct. 28, 2021   (CN) .......................... 202111266487.4

(51) Int. Cl.
*H04N 21/431*    (2011.01)
*G11B 27/10*    (2006.01)
*G11B 27/34*    (2006.01)
*H04N 21/2743*    (2011.01)

(52) U.S. Cl.
CPC ....... *H04N 21/4316* (2013.01); *G11B 27/105* (2013.01); *G11B 27/34* (2013.01); *H04N 21/2743* (2013.01)

(58) Field of Classification Search
CPC ........... H04N 21/4316; H04N 21/2743; G11B 27/105; G11B 27/37
See application file for complete search history.

(56) References Cited

U.S. PATENT DOCUMENTS

| | | |
|---|---|---|
| 9,583,142 B1 | 2/2017 | Zhu et al. |
| 2018/0349513 A1* | 12/2018 | Hornkvist ......... G06F 16/24578 |
| 2021/0035541 A1* | 2/2021 | Pande ................... G10H 1/361 |
| 2022/0237229 A1* | 7/2022 | Wong ................ G06F 16/90332 |

(Continued)

FOREIGN PATENT DOCUMENTS

| | | |
|---|---|---|
| CN | 305210712 | 6/2019 |
| CN | 111163274 A | 5/2020 |
| CN | 111767430 A | 10/2020 |

(Continued)

OTHER PUBLICATIONS

International Search Report dated May 16, 2023 in International Application No. PCT/SG2022/050744, with English translation (7 pages).

*Primary Examiner* — Yassin Alata
(74) *Attorney, Agent, or Firm* — Faegre Drinker Biddle & Reath LLP

(57) ABSTRACT

This disclosure relates to a video processing method, a video processing apparatus, and a non-transitory computer-readable storage medium. The video processing method includes: providing an interactive interface of entering a duet mode for a user in response to a shooting request of the user; presenting a plurality of recommended duet videos to the user through a duet mode interface in response to the user's selection of the duet mode on the interactive interface; and performing a duet in response to a duet request inputted by the user based on one of the plurality of recommended duet videos.

17 Claims, 10 Drawing Sheets

(56) References Cited

U.S. PATENT DOCUMENTS

2022/0292875 A1\* 9/2022 Zhang ................ H04N 21/4788
2022/0329895 A1\* 10/2022 Zhang .............. H04N 21/25875

FOREIGN PATENT DOCUMENTS

| CN | 111408136 | 2/2021 |
| CN | 113271478 A | 8/2021 |
| CN | 113395588 A | 9/2021 |
| CN | 113553509 A | 10/2021 |

\* cited by examiner

VIDEO PROCESSING METHOD, VIDEO PROCESSING APPARATUS, AND NON-TRANSITORY COMPUTER-READABLE STORAGE MEDIUM

CROSS-REFERENCE TO RELATED APPLICATIONS

This application claims priority to Chinese Patent Application No. 202111266487.4, entitled "VIDEO PROCESSING METHOD, VIDEO PROCESSING APPARATUS, AND COMPUTER-READABLE STORAGE MEDIUM", and filed on Oct. 28, 2021. The entire disclosure of the prior application is hereby incorporated by reference in its entirety.

TECHNICAL FIELD

The present disclosure relates to the field of computer technologies, and in particular, to a video processing method, a video processing apparatus, and a non-transitory computer-readable storage medium.

BACKGROUND

A social network can provide, according to user's input, various services, such as photo or video sharing, messaging, etc., to facilitate social interactions between users.

By using interactions with the social network, the user can upload digital media to a system for browsing by others. The digital media can comprise image, video, audio, text, and the like. For example, the user can post a self-created video onto the social network. Other users on the social network can interact by means of likes, comments, forwarding and the like when viewing interested videos, and can also interact by means of duet videos.

With the user's increasing dependence on the social network, the user has higher and higher experience requirements for the social network.

SUMMARY

According to some embodiments of the present disclosure, there is provided a video processing method, comprising: providing an interactive interface of entering a duet mode for a user, in response to a shooting request of the user; presenting a plurality of recommended duet videos to the user through a duet mode interface, in response to the user's selection of the duet mode on the interactive interface; and performing a duet in response to a duet request inputted by the user based on one of the plurality of recommended duet videos.

According to other embodiments of the present disclosure, there is provided a video processing apparatus, comprising: a display configured to provide an interactive interface of entering a duet mode for a user, in response to a shooting request of the user, and present a plurality of recommended duet videos to the user through a duet mode interface, in response to the user's selection of the duet mode on the interactive interface; and a processor configured to perform a duet in response to a duet request inputted by the user based on one of the plurality of recommended duet videos.

According to still other embodiments of the present disclosure, there is provided a video processing apparatus, comprising: a memory; and a processor coupled to the memory, the processor being configured to perform, based on instructions stored in the memory, one or more steps of the video processing method of any of the embodiments according to the present disclosure.

According to further embodiments of the present disclosure, there is provided a non-transitory computer-readable storage medium having thereon stored a computer program which, when executed by a processor, performs the video processing method of any of the embodiments according to the present disclosure.

The "SUMMARY" is provided to introduce concepts in a simplified form, which will be described in detail below in the following "DETAILED DESCRIPTION OF THE DRAWINGS". The "SUMMARY" is not intended to identify key features or essential features of the claimed technical solutions, nor is it intended to limit the scope of the claimed technical solutions.

Other features, aspects, and advantages of the present disclosure will become apparent through the following detailed description of exemplary embodiments thereof, which is made with reference to the accompanying drawings.

BRIEF DESCRIPTION OF THE DRAWINGS

Preferred embodiments of the present disclosure are described below with reference to the accompanying drawings. The accompanying drawings described herein are intended to provide a further understanding of the present disclosure. The accompanying drawings, together with the following detailed description, are incorporated in and form a part of this specification, and serve to explain the present disclosure. It should be understood that the drawings in the following description relate only to some embodiments of the present disclosure, rather than limiting the present disclosure. In the drawings.

Figure 1:
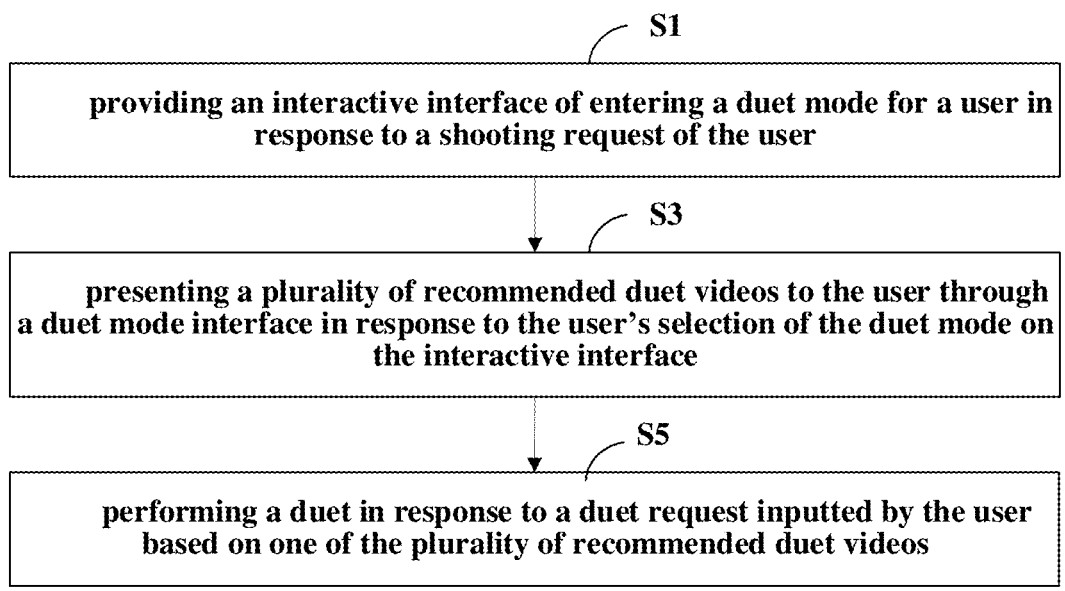
FIG. 1 illustrates a flow diagram of a video processing method according to some embodiments of the present disclosure.

It should be understood that sizes of various components shown in the drawings are not necessarily drawn to an actual scale for ease of illustration. Identical or similar reference numbers are used throughout the drawings to refer to identical or similar components. Thus, once a certain item is defined in one drawing, it may not be further discussed in subsequent drawings.

DETAILED DESCRIPTION

The technical solutions in the embodiments of the present disclosure will be described clearly and completely in conjunction with the drawings in the embodiments of the present disclosure, but it is obvious that the embodiments described are only some of the embodiments of the present disclosure, not all of the embodiments. The following description of the embodiments is merely illustrative in nature and is in no way intended to limit this disclosure, its application, or uses. It should be understood that the present disclosure can be implemented in various forms and should not be construed as limited to the embodiments set forth herein.

It should be understood that various steps recited in method embodiments of the present disclosure can be performed in a different order, and/or performed in parallel. Moreover, the method embodiments can comprise additional steps and/or omit performing the illustrated steps. The scope of the present disclosure is not limited in this respect. Unless specifically stated otherwise, relative arrangements of components and steps, numerical expressions, and numerical values set forth in these embodiments should be construed as merely illustrative, and do not limit the scope of the present disclosure.

A term "comprise" and variations thereof used in this disclosure are intended to be an open-minded term that comprises at least subsequent elements/features, but do not exclude other elements/features, i.e., "comprising but not limited to". Furthermore, a term "include" and variations thereof used in this disclosure are intended to be an open-minded term that includes at least subsequent elements/features, but does not exclude other elements/features, i.e., "including but not limited to". Thus, "comprise" is synonymous with "include". A term "based on" means "based at least in part on".

"One embodiment", "some embodiments", or "an embodiment" termed throughout this specification means that a specific feature, structure, or characteristic described in conjunction with the embodiment is included in at least one embodiment of the present invention. For example, the term "one embodiment" means "at least one embodiment"; the term "another embodiment" means "at least one other embodiment"; the term "some embodiments" means "at least some embodiments". Moreover, the phrases "in one embodiment", "in some embodiments", or "in an embodiment" appearing in various places throughout this specification do not necessarily all refer to a same embodiment, but can refer to the same embodiment.

It should be noted that notions of "first", "second", and the like mentioned in the present disclosure are only used for distinguishing different devices, modules or units, and are not used for limiting the order or interdependence of functions performed by these devices, modules or units. Unless otherwise specified, the notions of "first", "second", and the like, are not intended to imply that objects so described must be in a given order in time, space, rank, or in any other way.

It should be noted that modifiers of "one" and "more" mentioned in this disclosure are intended to be illustrative rather than restrictive, and those skilled in the art should appreciate that they should be understood as "one or more" unless otherwise clearly indicated in the context.

Names of messages or information exchanged between a plurality of devices in the embodiments of the present disclosure are for illustrative purposes only, and are not intended to limit the scope of these messages or information.

Embodiments of the present disclosure will be described in detail below in conjunction with the accompanying drawings, but the present disclosure is not limited to these specific embodiments. These specific embodiments can be combined with each other below, and identical or similar concepts or processes may not be repeated in some embodiments. Furthermore, in one or more embodiments, the specific feature, structure, or characteristic can be combined in any suitable manner that would be understood by one of ordinary skill in the art from this disclosure.

It should be understood that how an image or video to be applied/processed is obtained is also not limited in the present disclosure. In one embodiment of the present disclosure, the image or video can be acquired from a storage device, for example, an internal memory or an external storage device, and in another embodiment of the present disclosure, the image or video can be taken by a camera assembly. It should be noted that in the context of this specification, a type of the image or video is not specifically limited. Furthermore, the image or video can be a source image or video obtained by a camera device, or an image or video obtained by particularly processing the source image or video, such as preliminary filtering, antialiasing, color adjustment, contrast adjustment, normalization, and the like. It should be noted that the preprocessing operation can also comprise other types of preprocessing operations known in the art, which will not be repeated herein.

With the user's increasing dependence on the social network, the user has higher and higher experience requirements for the social network. To further enhance the experience on the social network, a new mode is created in a shooting request, for example, alongside camera, template, live streaming, with which the user can quickly discover a content that is easy to collaborate with, for example a popular duet video.

FIG. 1 illustrates a flow diagram of a video processing method according to some embodiments of the present disclosure.

As shown in FIG. 1, the video processing method comprises: step S1, providing an interactive interface of entering a duet mode for a user, in response to a shooting request of the user; step S3, presenting a plurality of recommended duet videos to the user through a duet mode interface, in response to the user's selection of the duet mode on the interactive interface; and step S5, performing a duet in response to a duet request inputted by the user based on one of the plurality of recommended duet videos.

In the step S1, the interactive interface can be provided in response to the user's selection of a camera option on a display interface of a terminal. In the related art, an entry to the duet is provided in a sharing interface, and according to an embodiment of the present disclosure, the entry to the duet is provided in a shooting interface, so that the user is capable of finding the duet interface more easily.

Figure 2:
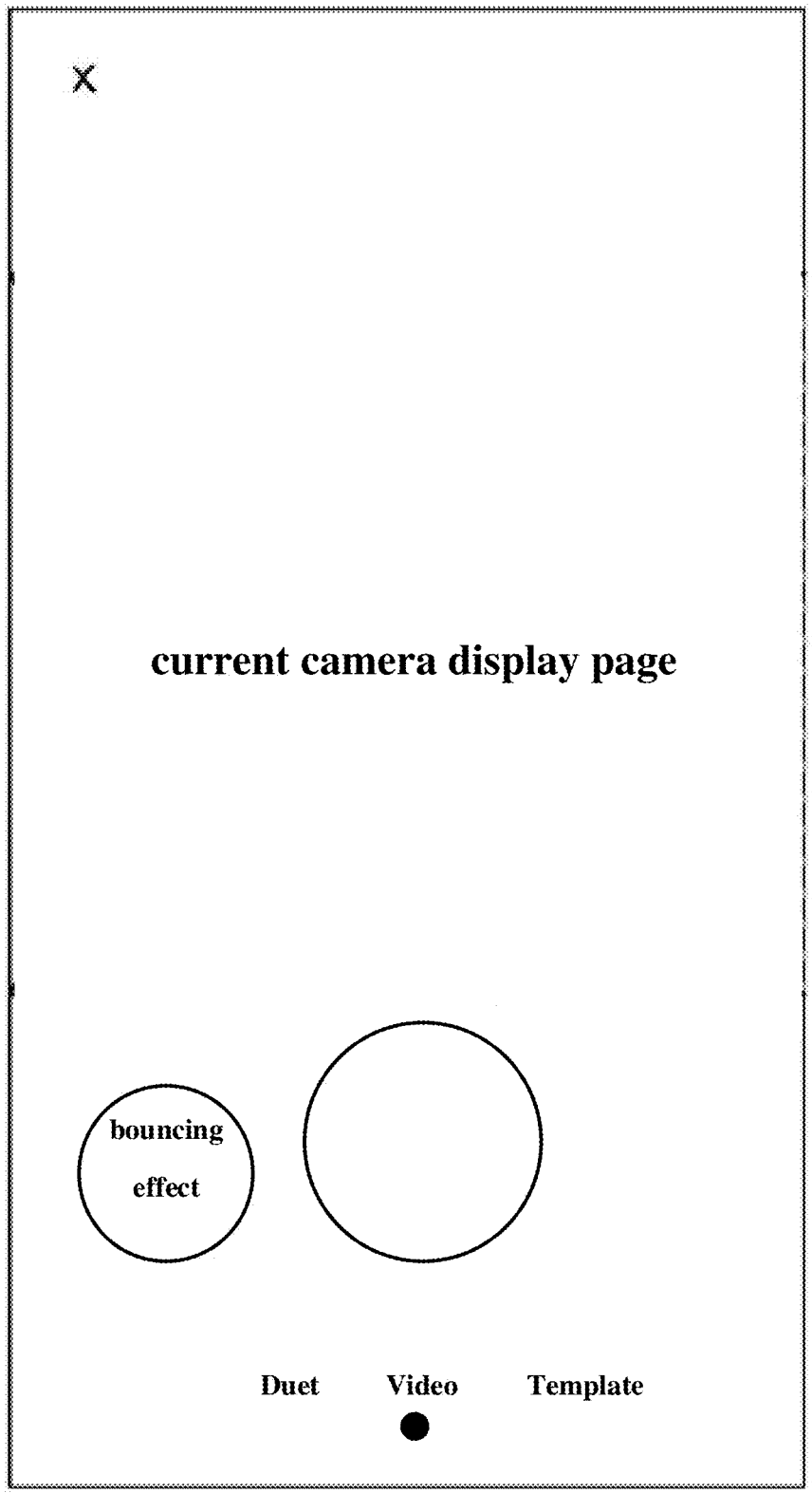
FIG. 2 illustrates a schematic diagram of an interactive interface according to some embodiments of the present disclosure.

FIG. 2 illustrates a schematic diagram of an interactive interface according to some embodiments of the present disclosure.

FIG. 2 illustrates a current camera display page. FIG. 2 also illustrates options of Duet, Video, Template, etc. in a bottom carousel of the interactive interface. The Duet option can be provided on the left of the Video option.

Next, in the step S3, when the user scrolls on the interactive interface to the Duet option in the bottom carousel, or selects the Duet option, the user selects the duet mode. Of course, the user can also scroll to other options such as the Video option or Template option.

After the user enters the duet mode, the duet mode interface can be presented to the user, and a plurality of recommended duet videos are presented to the user through the duet mode interface. Such a page can also be referred to as a "duet discovery page".

The duet mode interface where the plurality of recommended duet videos are presented to the user can adopt different manners as needed. The plurality of recommended duet videos can be presented to the user in a thumbnail form. The plurality of recommended duet videos can also be sequentially presented to the user in a full-screen form.

Figure 3A:
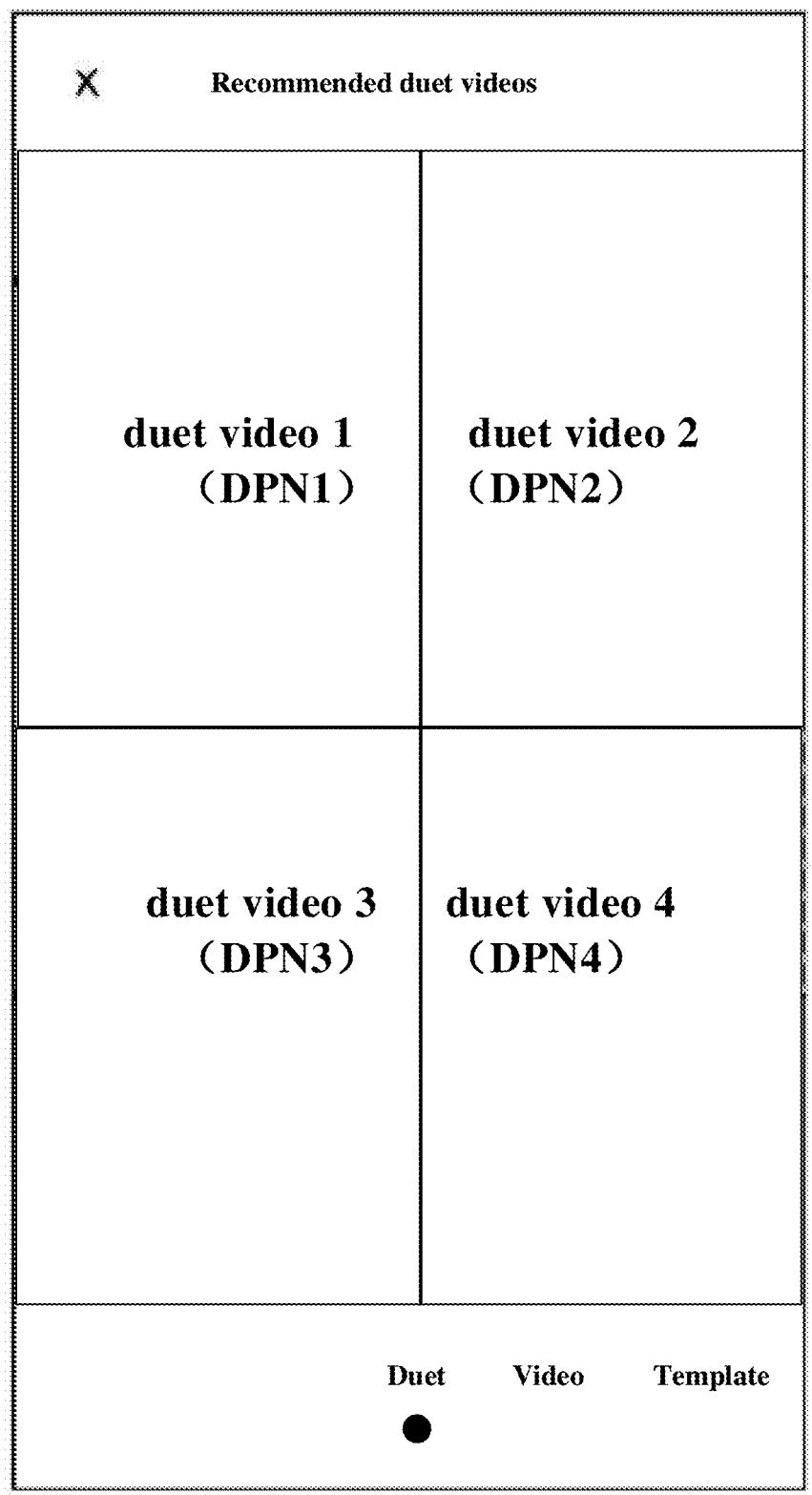
FIG. 3A illustrates a schematic diagram of a duet mode interface according to some embodiments of the present disclosure.

FIG. 3A illustrates a schematic diagram of a duet mode interface according to some embodiments of the present disclosure.

As shown in FIG. 3A, the duet mode interface is a user interface where "Recommended duet videos" are displayed in two columns. For example, on a user interface in a form of 2×2 grids, thumbnails of 4 recommended duet videos are presented to the user. The user is allowed to scroll the videos for playing, to discover more duet contents. In a top-left corner of the user interface shown in FIG. 3A, there is an exit to return to a screen outside the camera, and the Video option is still shown at the bottom thereof.

For example, when the user just enters the duet mode interface, thumbnails of 1st to 4th recommended duet videos are presented to the user; and in response to a gesture of the user, such as swipe-up, more duet videos are presented to the user, for example, thumbnails of 5th to 8th recommended duet videos, 9th to 12th recommended duet videos, and more recommended duet videos, are sequentially presented to the user. Of course, according to a size of the display screen of the user terminal, thumbnails of more recommended duet videos, such as 6, 8, and so on, can also be presented per screen. A thumbnail size can be adjusted according to an aspect ratio of a duet content. For example, a thumbnail can be set to be fixed in width and variable in height. A thumbnail of each duet video can be enlarged to the full screen. The presentation of the recommended duet videos in the thumbnail form can facilitate the user to discover an interested video more quickly.

To enhance the user experience, each tab is preloaded with thumbnails of a plurality of duet videos, for example, 20 thumbnails in 10 rows. When the user's operation scrolls to the bottom of the user interface, more thumbnails of duet videos are loaded.

In some embodiments, for each recommended duet video, a tag of its corresponding duet publish number (DPN) is displayed on its thumbnail. Tagging the duet publish number on the thumbnail of each recommended duet video can facilitate the user to discover popular video contents.

Figure 3B:
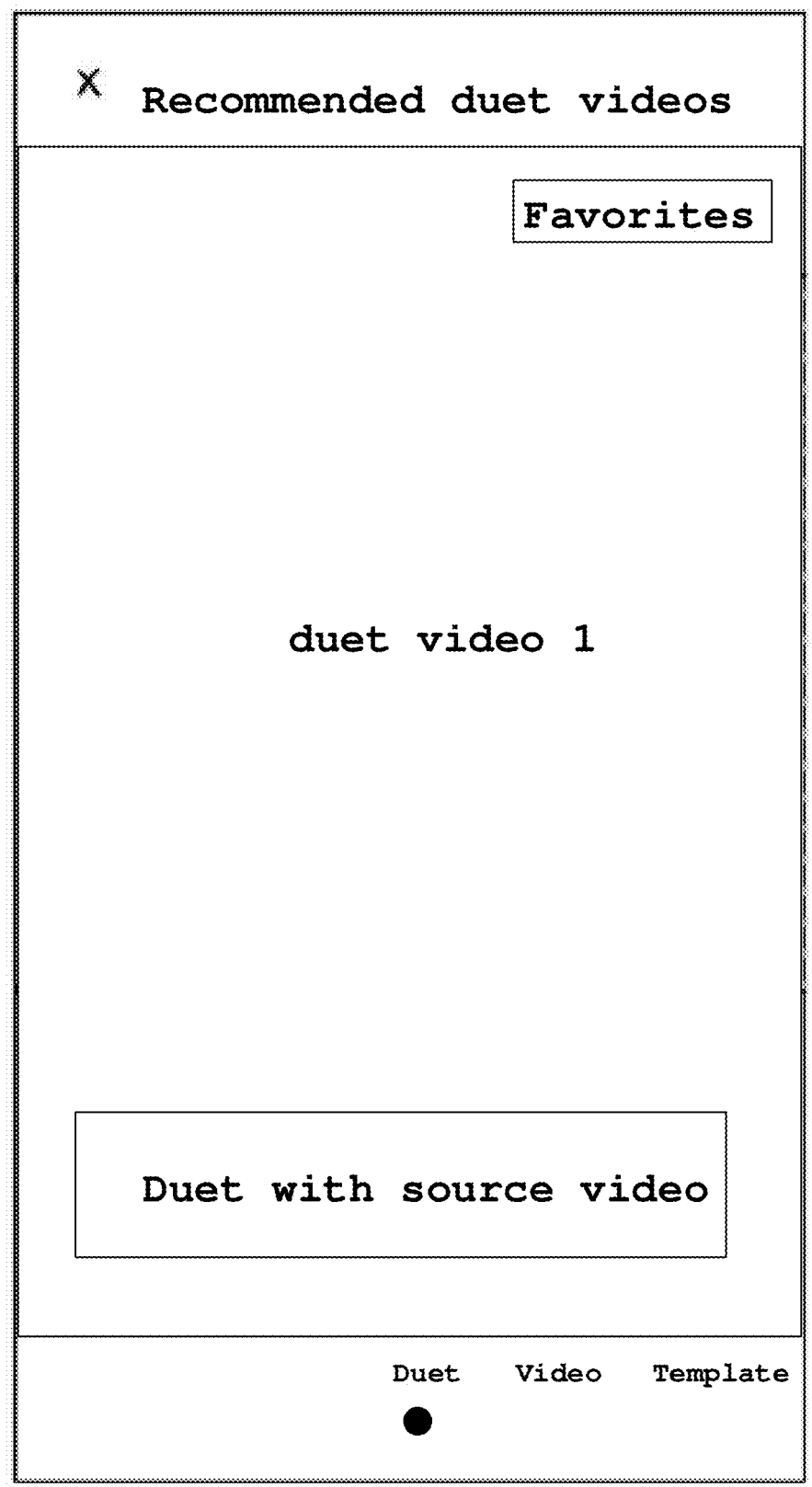
FIG. 3B illustrates a schematic diagram of a duet mode interface according to other embodiments of the present disclosure.

FIG. 3B illustrates a schematic diagram of a duet mode interface according to other embodiments of the present disclosure.

As shown in FIG. 3B, the duet mode interface is a user interface where each of the "Recommended duet videos" is displayed in full screen. The plurality of recommended duet videos are sequentially presented to the user in the full-screen form. For example, when the user just enters the duet mode interface, the 1st recommended duet video is presented to the user. The user can discover more duet contents by scrolling the video for playing. That is, in response to the user's gesture, for example, swipe-up, the 2nd recommended duet video, the 3rd recommended duet video, and more recommended duet videos are sequentially presented to the user. The presentation of the recommended duet videos in the full-screen form can provide the user with an immersive experience.

It has been described above in detail that the plurality of recommended duet videos can be presented to the user through the different user interfaces, and it will be described below which duet videos are presented to the user as the recommended duet videos.

In some embodiments, the presenting a plurality of recommended duet videos to the user through the duet mode interface comprises: ranking duet videos in a content pool according to a user behavior feature; and presenting a plurality of recommended duet videos ranked on top to the user according to the ranking result.

The user behavior feature can comprise: Video View (VV), publish number brought by a single view, duetted times, creation time, creation place, and the like. The publish number brought by the single view can be characterized by a ratio of the corresponding publish number to the Video View (Publish/VV).

In some embodiments, the duet video in the content pool can be limited that its Video View is greater than a threshold. For example, the threshold can be determined according to statistics of duet video number and Video View in different regions, for example, the threshold is set to 30 thousands for most countries or regions. In this way, regardless of whether the duet videos in the content pool are ranked according to the Video View or according to the publish number brought by the single view or other user behavior features, it is beneficial for discovering an interested video more efficiently by the user.

In other embodiments, the creation time of the duet video in the content pool can be limited to within a specified period of time. For example, the creation time of the duet video in the content pool can be limited to no more than 7 days. This can ensure that the duet videos in the content pool are refreshed continuously, which is beneficial for discovering more popular duet videos by the user, to improve the user experience.

In addition, in order to step up the protection for the user's privacy, only a video with a status of "visible to everyone" and allowing everyone to duet with can be taken as a recommended duet video. For example, privacy settings of the duet video in the content pool meet: a status being "visible to everyone", and allowing everyone to duet with.

How to rank the duet videos in the content pool according to the user behavior feature will be described in detail below in conjunction with the specific user behavior feature.

The duet videos can be ranked according to the publish number brought by the single view or according to a Video View. For example, the greater the publish number brought by the single view or the greater the Video View, the higher the rank.

Original videos can also be ranked according to duetted times (DT). For example, the more the duetted times, the higher the rank. Then, for each original video ranked on top, one or more duet videos with a maximum Video View among duet videos corresponding to the original video is presented to the user. That is to say, a plurality of suggested duet videos corresponding to a plurality of original videos ranked on top are presented to the user according to the ranking result, wherein each suggested duet video is a duet video with a maximum video view in duet videos duetted with a corresponding original video. Here, the duet video with the maximum Video View among the duet videos can be one or more duet videos.

To make it easier for users to discover recently popular duet videos, the creation time is also considered when ranking the duet videos in the content pool. In addition, since user behavior features in different countries or regions would be different, the creation place is also considered when the duet videos in the content pool are ranked. Therefore, in order to discover more popular local duet videos, the videos can be ranked according to at least one of the creation time or creation place.

For example, the more recent the creation time of the video, that is, the fewer the creation days, the higher its rank. In some embodiments, different weights can be set according to different importance of the creation time in ranking, to better match the user's needs.

In some embodiments, when the plurality of recommended duet videos ranked on top are presented to the user according to the ranking result, only recommended duet videos ranked on top within each unit time can be presented according to the creation time. For example, for each of the above ranking logics, only top (for example, top 200) videos per day can be presented according to the creation time. In this way, the user can be made to more efficiently discover interested popular videos.

After browsing the plurality of recommended duet videos or thumbnails, the user can select a video for duetting with, and input a duet request.

FIGS. 4A to 4D illustrate schematic diagrams of inputting a duet request to perform a duet according to some embodiments of the present disclosure.

Figure 4A:
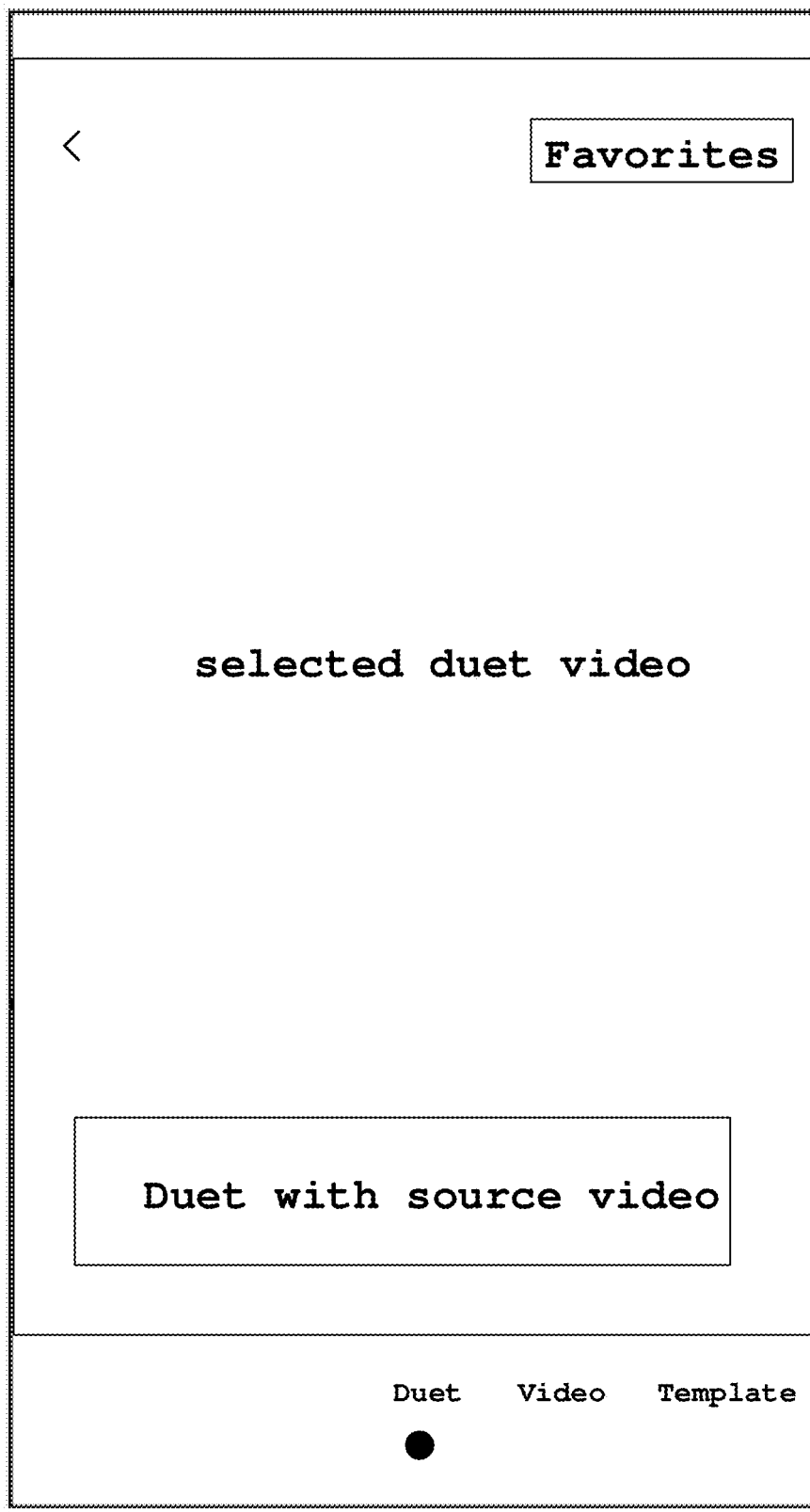
FIGS. 4A to 4D illustrate schematic diagrams of inputting a duet request to perform a duet according to some embodiments of the present disclosure.
Figure 4B:
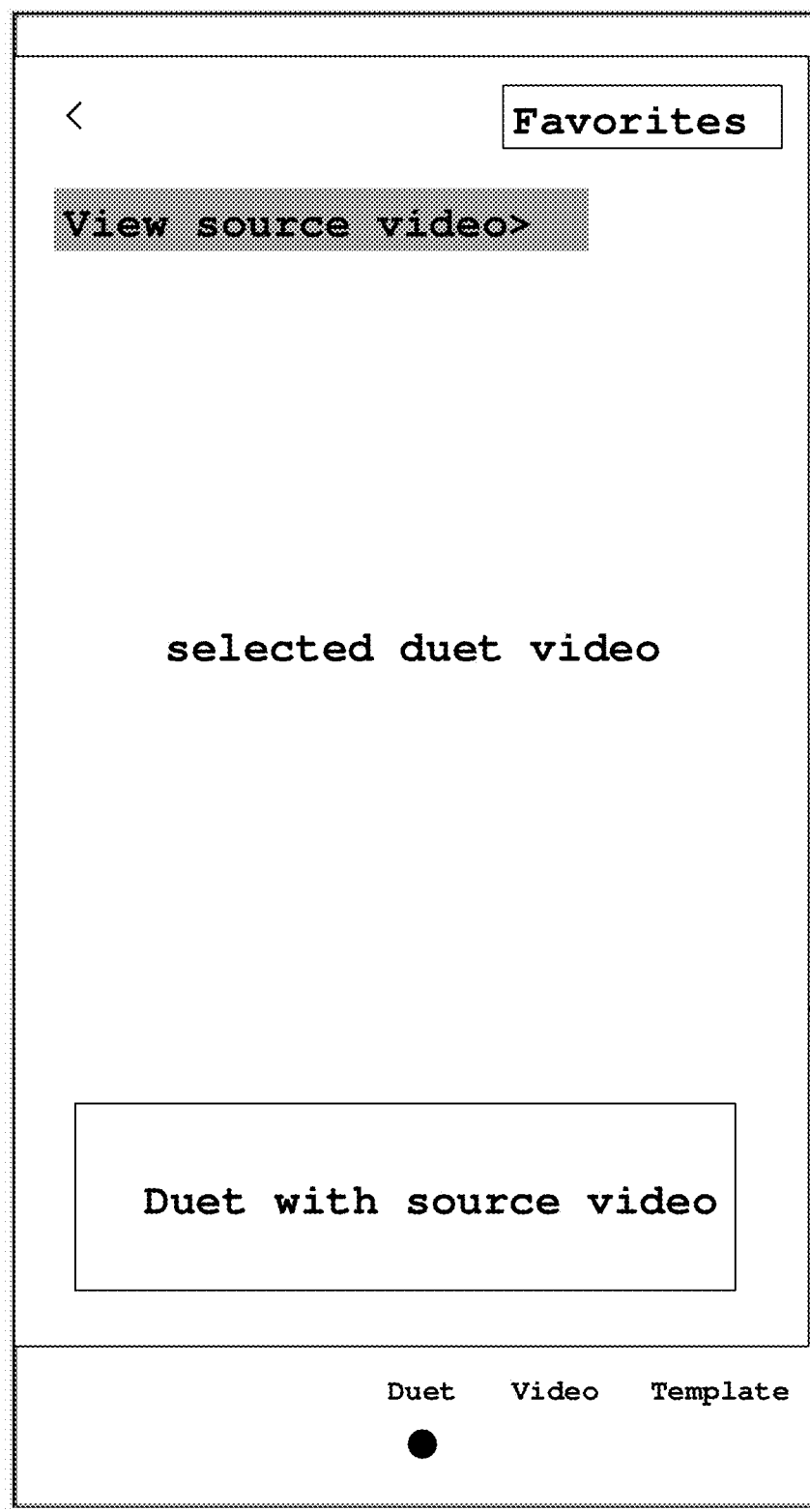
Figure 4C:
Figure 4D:
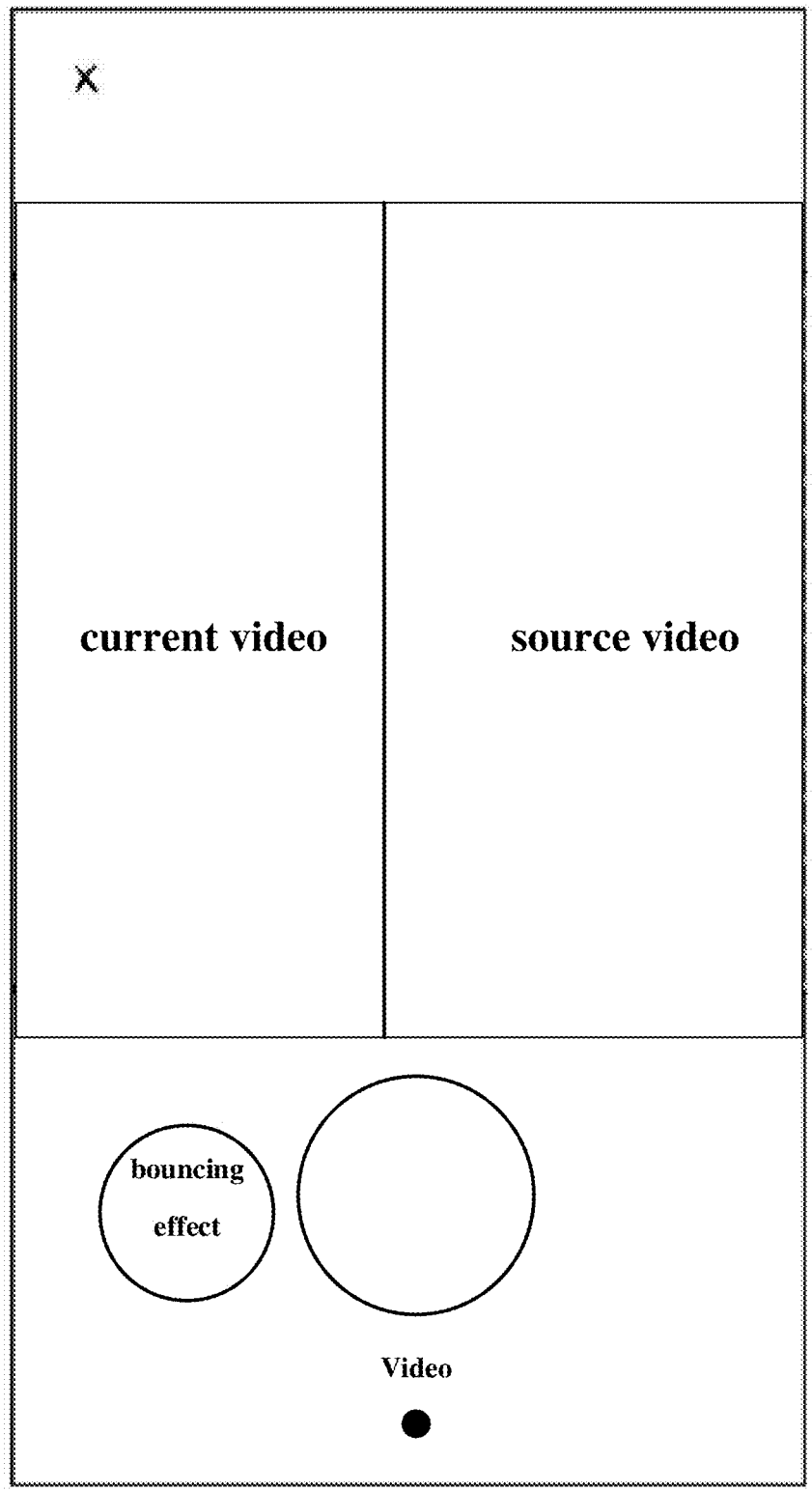

For the user interface of the recommended duet videos in the thumbnail form, when the user selects a certain recommended duet video to play, a duet mode video player plays the duet video selected by the user, such as a page shown in FIG. 4A. The user clicks on the duet video on the page shown in FIG. 4A, and a tooltip of "View source video" will appear, such as a page shown in FIG. 4B. After clicking on the tooltip, the user enters a display page of the source video, as shown in FIG. 4C. Options of Return and "Duet with video" are provided on the source video of FIG. 4C. The user selects the "Duet with video" option, i.e., inputs a duet request, and can perform a duet with the source video. A display page for performing the duet is shown in FIG. 4D.

As shown in FIGS. 4A to 4D, the user selects the recommended duet video, and inputs the duet request through the display page of the corresponding source video to perform the duet with the source video. That is, in the step S5, the duet with the source video can be performed in response to the duet request inputted by the user based on the source video corresponding to the selected recommended duet video.

In other embodiments, the user can also directly input the duet request through a display page of the selected recommended duet video. As shown in FIG. 4A, on the display page of the recommended duet video selected by the user, a "Duet with source video" option is provided. The user can directly enter the duet with the source video by selecting the "Duet with source video" option, and a display page for performing the duet is also shown in FIG. 4D. That is, in the step S5, the duet with the source video can also be performed in response to the duet request inputted by the user based on the selected recommended duet video.

On the page shown in FIG. 4A, the "Duet with source video" option can be displayed, but the display of other metadata is limited.

For the user interface of the recommended duet video in the full-screen form, when the user browses any recommended duet video, the duet mode video player can play the duet video, such as the page shown in FIG. 3B, which is similar to the page shown in FIG. 4A. Accordingly, the user clicks on the duet video on the page shown in FIG. 3B, and then the tooltip of "View source video" will appear, which is similar to the page shown in FIG. 4B. After clicking on the tooltip, the user enters the display page of the source video, as shown in FIG. 4C. The options of Return and "Duet with video" are provided on the source video of FIG. 4C. The user selects the "Duet with video" option, i.e., inputs the duet request, and can perform the duet with the source video. The display page for performing the duet is shown in FIG. 4D.

Of course, for the user interface of the recommended duet video in the full-screen form, the user can also, directly through the display page of the selected recommended duet video, input the duet request. Similar to the user-selected display page of the recommended duet video as shown in FIG. 4A, the "Duet with source video" option is also provided on the page shown in FIG. 3B. The user can directly enter the duet with the source video by selecting the "Duet with source video" option, and the display page for performing the duet is also shown in FIG. 4D.

It has been described above in conjunction with FIGS. 3A to 3B and FIGS. 4A to 4D that in the step S5, the duet with the source video is performed in response to the duet request inputted by the user based on one of the plurality of recommended duet videos. In other embodiments, in the step S5, the duet with the selected recommended duet video can also be performed in response to the duet request inputted by the user based on the selected recommended duet video.

In some embodiments, when the user first opens the duet mode video player, a bouncing effect is animated on the display page to show the user that he/she can scroll to discover more contents. The user can scroll up and down to view a new video. If the user browses a first material, refresh is not allowed.

In addition, a Favorites option can also be provided on the pages of FIG. 3B and FIGS. 4A to 4C, for example, on top-right corners. The user can click on the Favorites option and add a viewed video into the favorites.

With the duet mode video player, the user can be incentivized to use the viewed video in creation, or save it for later use, and the user can be enabled to get a better understanding of how to perform creation using the viewed video.

In the foregoing embodiments, the video processing method according to various embodiments of the present disclosure have been fully described. By the above video processing method, inspiration can be efficiently provided for potential creators, the efficiency of finding the duet videos by the user is improved, and the efficiency of discovering popular duet videos by the user is improved.

According to the embodiment of the present disclosure, there is also provided a video processing apparatus capable of implementing the video processing method.

Figure 5:
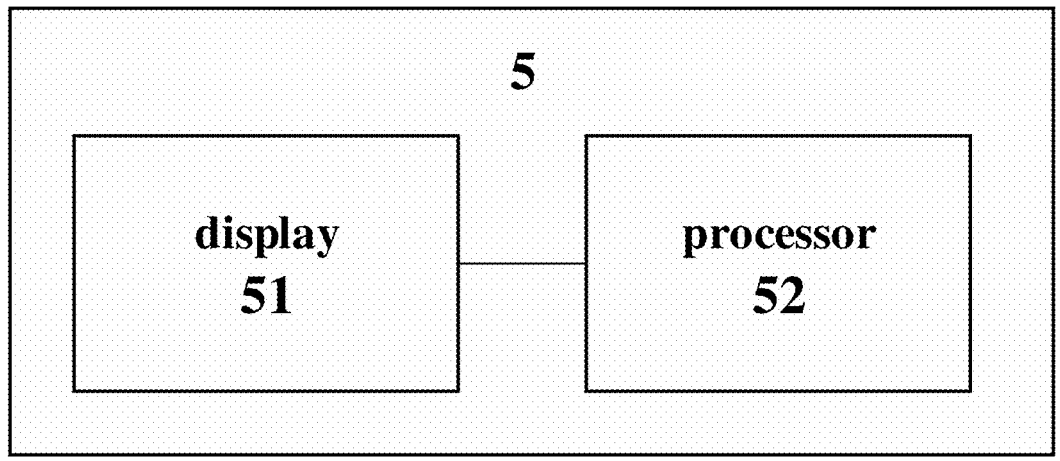
FIG. 5 illustrates a block diagram of a video processing apparatus according to some embodiments of the present disclosure.

FIG. 5 illustrates a block diagram of a video processing apparatus according to some embodiments of the present disclosure.

As shown in FIG. 5, a video processing apparatus 5 comprises a display 51 and a processor 52.

The display 51 is configured to: provide an interactive interface of entering a duet mode for a user, in response to a shooting request of the user; and presenting a plurality of recommended duet videos to the user through a duet mode interface, in response to the user's selection of the duet mode on the interactive interface. For example, the display 51 can perform the aforementioned steps S1 and S3 under the control of the processor 52.

The processor 52 is configured to perform a duet in response to a duet request inputted by the user based on one of the plurality of recommended duet videos. For example, the processor 52 performs the aforementioned step S5.

Furthermore, although not shown, the apparatus can also comprise a memory, which can have thereon stored various information generated in operations by the video processing apparatus and the units included in the video processing apparatus, programs and data for the operations, and the like. The memory can be a volatile memory and/or non-volatile memory. For example, the memory can include, but is not limited to, a random access memory (RAM), dynamic random access memory (DRAM), static random access memory (SRAM), read-only memory (ROM), flash memory. Of course, the memory can also be located outside the video processing apparatus.

Figure 6:
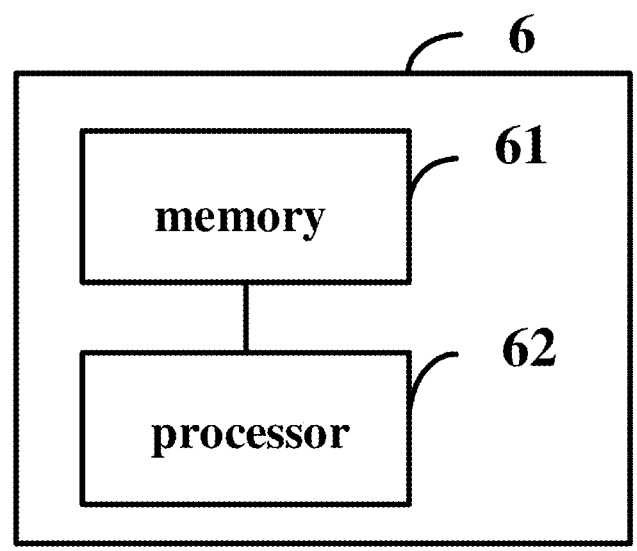
FIG. 6 illustrates a block diagram of a video processing apparatus according to other embodiments of the present disclosure.

FIG. 6 illustrates a block diagram of a video processing apparatus according to other embodiments of the present disclosure.

In some embodiments, a video processing apparatus 6 can be various types of devices, which can include, but are not limited to, for example, mobile terminals such as a mobile phone, a notebook computer, a digital broadcast receiver, a PDA (Personal Digital Assistant), a PAD (Tablet Personal Computer), a PMP (Portable Multimedia Player), a vehicle-mounted terminal (for example, a vehicle-mounted navigation terminal), and the like, and fixed terminals such as a digital TV, a desktop computer, and the like.

As shown in FIG. 6, the video processing apparatus 6 comprises: a memory 61 and a processor 62 coupled to the memory 61. It should be noted that the components of the video processing apparatus 6 shown in FIG. 6 are only exemplary and not restrictive, and the video processing apparatus 6 can also have other components according to the needs of practical application. The processor 62 can control the other components in the video processing apparatus 6 to perform a desired function.

In some embodiments, the memory 61 is configured to store one or more computer-readable instructions. The processor 62 is configured to run the computer-readable instructions and when the computer-readable instructions are run by the processor 62, implements one or more steps of the method according to any of the above embodiments. For example, the processor 62 is configured to run the computer-readable instructions and when the computer-readable instructions are run by the processor 62, perform a video processing method, comprising: providing an interactive interface of entering a duet mode for a user, in response to a shooting request of the user; presenting a plurality of recommended duet videos to the user through a duet mode interface, in response to the user's selection of the duet mode on the interactive interface; and performing a duet in response to a duet request inputted by the user based on one of the plurality of recommended duet videos. For specific implementations of each step of the method and related explanations, reference can be made to the above embodiments, which are not repeated herein.

For example, the processor 62 and the memory 61 can be in direct or indirect communication with each other. For example, the processor 62 and the memory 61 can communicate through a network. The network can comprise a wireless network, a wired network, and/or any combination of wireless and wired networks. The processor 62 and the memory 61 can also communicate with each other through a system bus, which is not limited in the present disclosure.

For example, the processor 62 can be embodied as various suitable processors, processing devices, and the like, such as a central processing unit (CPU), graphics processing unit (GPU), network processor (NP), and the like; but can also be a digital signal processor (DSP), application specific integrated circuit (ASIC), field programmable gate array (FPGA) or other programmable logic device, discrete gate or transistor logic, discrete hardware component. The central processing unit (CPU) can be an X86 or ARM architecture, etc. For example, the memory 61 can include any combination of various forms of non-transitory computer-readable storage media, such as a volatile memory and/or non-volatile memory. The memory 61 can include, for example, a system memory, which has thereon stored, for example, an operating system, application, boot loader, database, other program, and the like. Various applications and various data and the like can also be stored in the storage medium.

Figure 7:
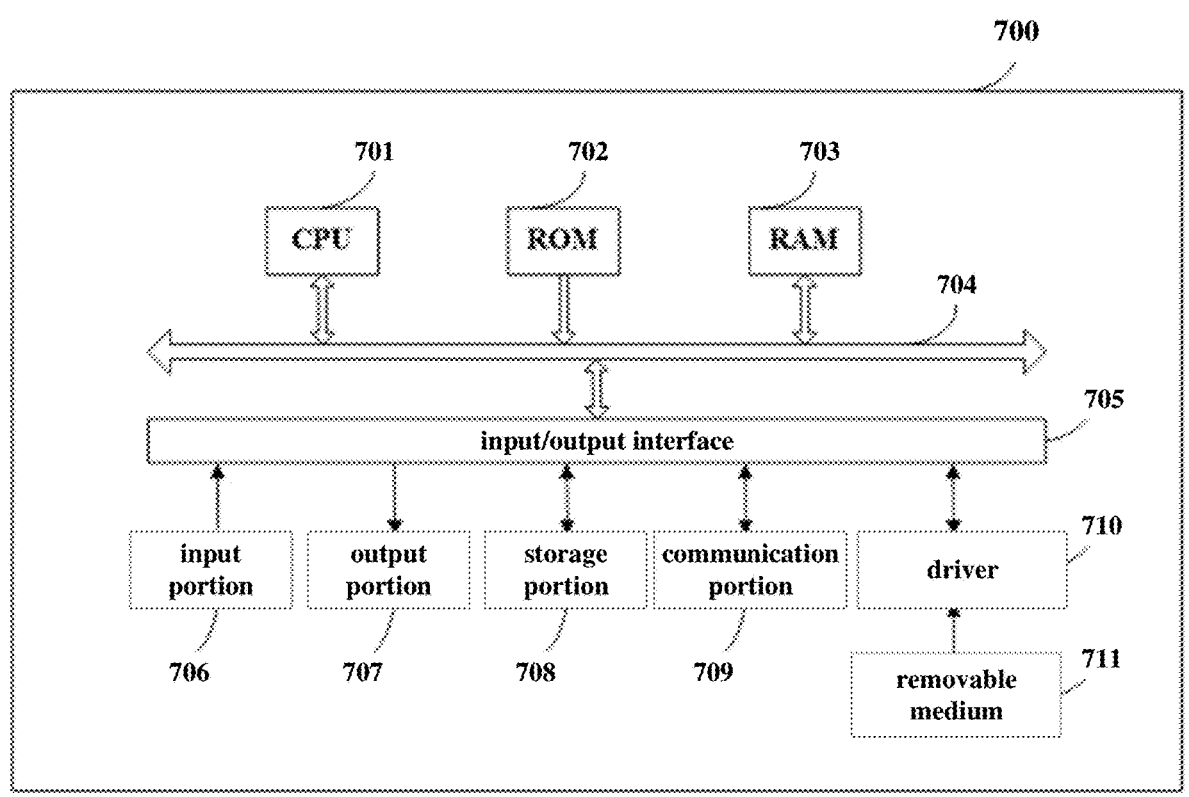
FIG. 7 illustrates a block diagram of an electronic device according to some embodiments of the present disclosure.

In addition, according to some embodiments of the present disclosure, in the case where various operations/processing according to the present disclosure are implemented by software and/or firmware, a program constituting the software can be installed from a storage medium or a network to a computer system having a dedicated hardware structure, for example, a computer system of an electronic device 700 shown in FIG. 7, which when having thereon installed the various programs, is capable of performing various functions including functions such as those described above, and the like.

In FIG. 7, a central processing unit (CPU) 701 executes various processes according to a program stored in a read-only memory (ROM) 702 or a program loaded from a storage portion 708 to a random access memory (RAM) 703. In the RAM 703, data required when the CPU 701 executes the various processes and the like is also stored as needed. The central processing unit is merely exemplary and can also be another type of processor, such as the various processors described above. The ROM 702, RAM 703, and storage portion 708 can be various forms of non-transitory computer-readable storage media, as described below. It should be noted that although the ROM 702, RAM 703, and storage portion 708 are shown separately in FIG. 7, one or more of them can be combined or located in a same memory or storage module or different memories or storage modules.

The CPU 701, ROM 702, and RAM 703 are connected to each other via a bus 704. An input/output interface 705 is also connected to the bus 704.

The following components are connected to the input/output interface 705: an input portion 706 such as a touch screen, a touch pad, a keyboard, a mouse, an image sensor, a microphone, an accelerometer, a gyroscope, or the like; an output portion 707 including a display such as a cathode ray tube (CRT), a liquid crystal display (LCD), a speaker, a vibrator, and the like; a storage portion 708 including a hard disk, a magnetic tape, and the like; and a communication portion 709 including a network interface card such as a LAN card, a modem, and the like. The communication portion 709 allows communication processing to be performed via a network such as the Internet. It is readily appreciated that while the various devices or modules in the electronic device 700 are shown in FIG. 7 communicate through the bus 704, they can also communicate through a network or other means, wherein the network can comprise a wireless network, a wired network, and/or any combination of wireless and wired networks.

A driver 710 is also connected to the input/output interface 705 as needed. A removable medium 711 such as a magnetic disk, an optical disk, a magneto-optical disk, a semiconductor memory, or the like is mounted on the drive 710 as needed, so that a computer program read out therefrom is installed in the storage portion 708 as needed.

In the case where the above series of processing is realized by software, a program constituting the software can be installed from a network such as the Internet or a storage medium such as the removable medium 711.

According to an embodiment of the present disclosure, a process described above with reference to a flow diagram can be implemented as a computer software program. For example, in the embodiment of the present disclosure, a computer program product is comprised, which comprises a computer program carried on a computer-readable medium, the computer program comprising program code for performing the method illustrated by the flow diagram. In such an embodiment, the computer program can be downloaded and installed from a network via the communication device 709, or installed from the storage portion 708, or installed from the ROM 702. The computer program, when executed by the CPU 701, performs the above functions defined in the method of the embodiment of the present disclosure.

It should be noted that in the context of this disclosure, the computer-readable medium can be tangible medium that can have thereon contained or stored a program for use by or in conjunction with an instruction execution system, apparatus, or device. The computer-readable medium can be a computer-readable signal medium or a non-transitory computer-readable storage medium or any combination of the two. The non-transitory computer-readable storage medium can be, for example, but is not limited to: an electronic, magnetic, optical, electromagnetic, infrared, or semiconductor system, apparatus, or device, or any combination of the above. More specific examples of the non-transitory computer-readable storage medium can comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the non-transitory computer-readable storage medium can be any tangible medium that has thereon contained or stored a program for use by or in conjunction with an instruction execution system, apparatus, or device. However, in the present disclosure, the computer-readable signal medium can comprise a data signal propagated in baseband or as part of a carrier wave, in which computer-readable program code is carried. Such a propagated data signal can take any of a variety of forms, including but not limited to, an electro-magnetic signal, an optical signal, or any suitable combination of the above. The computer-readable signal medium can also be any computer-readable medium other than the non-transitory computer-readable storage medium, and can send, propagate, or transmit a program for use by or in conjunction with an instruction execution system, apparatus, or device. The program code contained on the computer-readable medium can be transmitted using any suitable medium, including but not limited to: a wire, optical cable, RF (Radio Frequency), etc., or any suitable combination of the above.

The computer-readable medium can be included in the electronic device; can also be separate and not assembled into the electronic device.

In some embodiments, there is also provided a computer program, comprising: instructions which, when executed by a processor, cause the processor to perform the method of any of the embodiments described above. For example, the instructions can be embodied as computer program code.

In the embodiment of the present disclosure, computer program code for performing operations of the present disclosure can be written in one or more programming languages or any combination thereof, the programming language including but not limited to an object-oriented programming language such as Java, Smalltalk, C++, also including a conventional procedural programming language such as a "C" programming language or a similar programming language. The program code can be executed entirely on a user's computer, partly on the user's computer, as a stand-alone software package, partly on the user's computer and partly on a remote computer, or entirely on the remote computer or server. In a scenario where the remote computer is involved, the remote computer can be connected to the user's computer through any type of network, including a local area network (LAN) or a wide area network (WAN), or can be connected to an external computer (for example, through the Internet using an Internet service provider).

Flow diagrams and block diagrams in the drawings illustrate the possible architecture, functions, and operations of systems, methods and computer program products according to various embodiments of the present disclosure. In this regard, each block in the flow diagram or block diagram can represent one module, program segment, or portion of code, which comprises one or more executable instructions for implementing specified logical functions. It should also be noted that, in some alternative implementations, the functions noted in the blocks can also occur in a different order from the order noted in the drawings. For example, two blocks shown in succession can, in fact, be executed substantially in parallel, or they can sometimes be executed in the reverse order, which depends upon the functions involved. It will also be noted that each block in the block diagrams and/or flow diagrams, and a combination of the blocks in the block diagrams and/or flow diagrams, can be implemented by a special-purpose hardware-based system that performs the specified functions or operations, or a combination of special-purpose hardware and computer instructions.

A involved module, component or unit described in an embodiment of the present disclosure can be implemented by software or hardware. A name of the module, component, or unit does not in some cases constitute a limitation on the module, component, or unit itself.

The functions described above herein can be performed, at least in part, by one or more hardware logic components. For example, without limitation, exemplary hardware logic components that can be used comprise: a field programmable gate array (FPGA), application specific integrated circuit (ASIC), application specific standard product (ASSP), system on chip (SOC), complex programmable logic device (CPLD), and the like.

The above description is only some of the embodiments of the present disclosure and an explanation of applied technical principles. It should be appreciated by those skilled in the art that the disclosure scope involved in the present disclosure is not limited to a technical solution formed by a specific combination of the above features, but also encompasses another technical solution formed by an arbitrary combination of the above features or their equivalent features without departing from the above disclosure concepts. For example, it is a technical solution formed by replacing the above features with technical features having functions similar to the disclosed (but not limited to) in the present disclosure.

In the description provided herein, numerous specific details are set forth. However, it is understood that embodiments of this invention can be implemented without these specific details. In other cases, well-known methods, structures and techniques have not been presented in detail in order not to obscure the understanding of this description.

Furthermore, while the operations are depicted in a specific order, this should not be understood as requiring that these operations be performed in the specific order shown or in a sequential order. Under certain circumstances, multitasking and parallel processing can be advantageous. Similarly, while several specific implementation details are included in the above discussion, these should not be construed as limitations on the scope of the present disclosure. Certain features described in the context of separate embodiments can also be implemented in combination in a single embodiment. Conversely, various features described in the context of a single embodiment can also be implemented in multiple embodiments separately or in any suitable subcombination.

Although some specific embodiments of the present disclosure have been described in detail by way of examples, it should be understood by those skilled in the art that the above examples are for illustration only and are not intended to limit the scope of the present disclosure. It should be appreciated by those skilled in the art that modifications can be made to the above embodiments without departing from the scope and spirit of the present disclosure. The scope of the present disclosure is defined by the attached claims.

What is claimed is:

1. A video processing method, comprising:
   providing an interactive interface of entering a duet mode for a user, in response to a shooting request of the user;
   presenting a plurality of recommended duet videos to the user through a duet mode interface, in response to the user's selection of the duet mode on the interactive interface; and
   performing a duet in response to a duet request inputted by the user based on one of the plurality of recommended duet videos.

2. The video processing method according to claim 1, wherein a Duet option and a Video option are comprised on the interactive interface.

3. The video processing method according to claim 1, wherein the presenting a plurality of recommended duet videos to the user through a duet mode interface comprises:
   presenting the plurality of recommended duet videos to the user in a thumbnail form; or
   sequentially presenting the plurality of recommended duet videos to the user in a full-screen form.

4. The video processing method according to claim 1, wherein the presenting a plurality of recommended duet videos to the user through a duet mode interface comprises:
   ranking duet videos in a content pool according to a user behavior feature; and
   presenting the plurality of recommended duet videos ranked on top to the user according to a ranking result.

5. The video processing method according to claim 4, wherein the presenting a plurality of recommended duet videos to the user through a duet mode interface comprises:
   ranking the duet videos according to a publish number brought by a single view or according to Video View; and
   presenting the plurality of recommended duet videos ranked on top to the user according to the ranking result.

6. The video processing method according to claim 4, wherein the presenting a plurality of recommended duet videos to the user through a duet mode interface comprises:
   ranking original videos according to duetted times; and
   for each original video ranked on top, presenting one or more duet videos with a maximum Video View among duet videos corresponding to the original video to the user.

7. The video processing method according to claim 4, wherein the duet video in the content pool meets at least one of:
   creation time being within a specified period of time;
   Video View being greater than a threshold; or
   a status of the duet video being "visible to everyone" and allowing everyone to duet with.

8. The video processing method according to claim 7, wherein the threshold is determined according to statistics of duet video number and Video View in different regions.

9. The video processing method according to any of claim 4, wherein the ranking is performed according to at least one of creation time or creation place.

10. The video processing method according to any of claim 4, wherein the presenting a plurality of recommended duet videos ranked on top to the user according to a ranking result comprises:
    presenting only recommended duet videos ranked on top within each unit time according to creation time.

11. The video processing method according to claim 1, wherein the presenting a plurality of recommended duet videos to the user through a duet mode interface comprises:
    displaying, on each recommended duet video, a tag of corresponding duet publish number.

12. The video processing method according to claim 1, wherein the performing a duet in response to a duet request inputted by the user based on one of the plurality of recommended duet videos comprises:
    in response to a duet request inputted by the user based on a source video corresponding to a selected recommended duet video, performing a duet with the source video; or
    performing the duet with the source video in response to a duet request inputted by the user based on the selected recommended duet video; or
    performing a duet with the selected recommended duet video in response to a duet request inputted by the user based on the selected recommended duet video.

13. A video processing apparatus, comprising:
    a display configured to
        provide an interactive interface of entering a duet mode for a user, in response to a shooting request of the user, and
        present a plurality of recommended duet videos to the user through a duet mode interface in response to the user's selection of the duet mode on the interactive interface; and
    a processor configured to perform a duet in response to a duet request inputted by the user based on one of the plurality of recommended duet videos.

14. A video processing apparatus, comprising:
    a memory; and
    a processor coupled to the memory, the processor being configured to perform, based on instructions stored in the memory, a video processing method, comprising:
        providing an interactive interface of entering a duet mode for a user, in response to a shooting request of the user;
        presenting a plurality of recommended duet videos to the user through a duet mode interface, in response to the user's selection of the duet mode on the interactive interface; and
        performing a duet in response to a duet request inputted by the user based on one of the plurality of recommended duet videos.

15. The video processing apparatus according to claim 14, wherein a Duet option and a Video option are comprised on the interactive interface.

16. The video processing apparatus according to claim 14, wherein the presenting a plurality of recommended duet videos to the user through a duet mode interface comprises:

presenting the plurality of recommended duet videos to the user in a thumbnail form; or sequentially presenting the plurality of recommended duet videos to the user in a full-screen form.

17. A non-transitory computer-readable storage medium having thereon stored a computer program which, when executed by a processor, performs the video processing method according to claim 1.

\* \* \* \* \*